United States Patent Office 3,254,908
Patented June 7, 1966

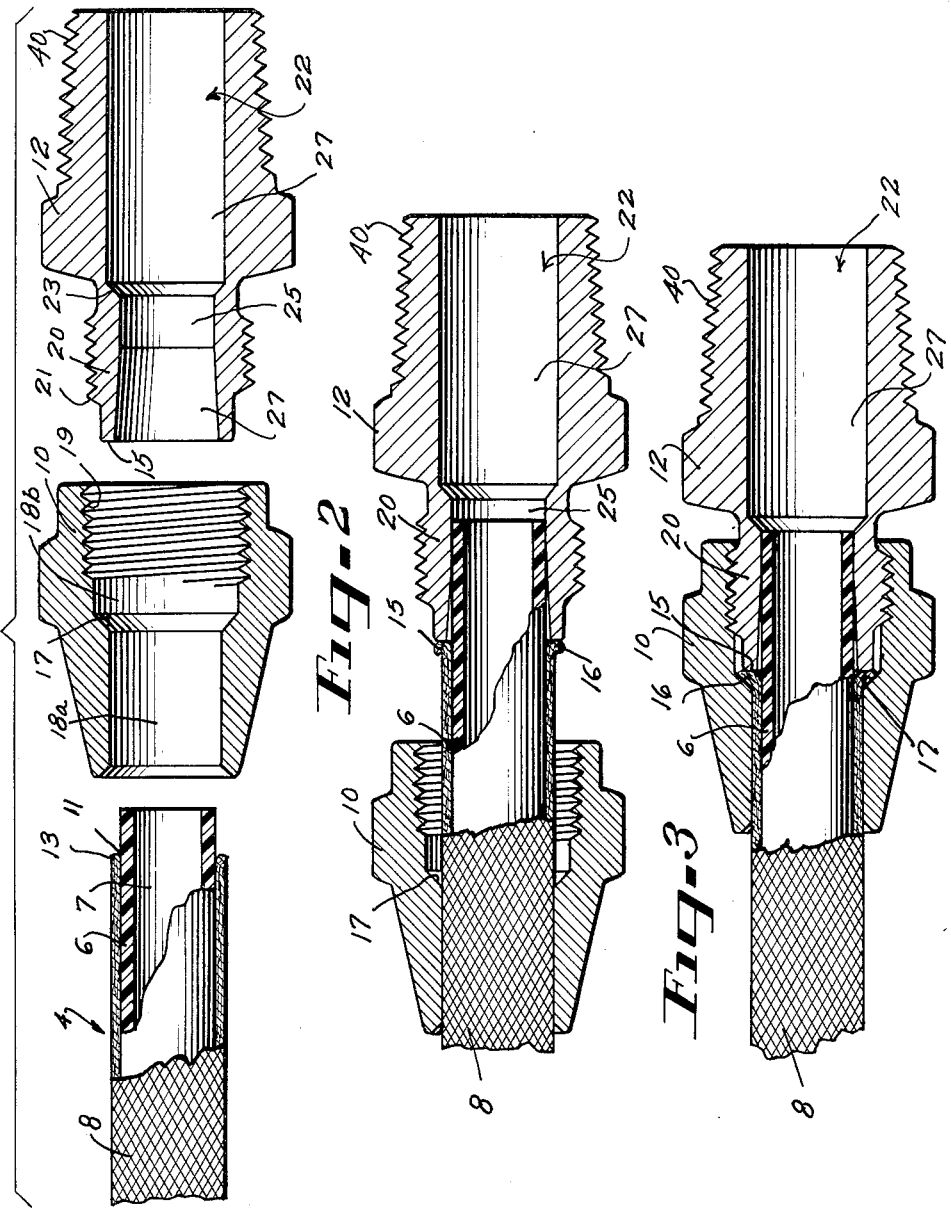

3,254,908
PRESSURE HOSE FITTING
Paul W. Schlosser, Chicago, Ill., assignor to Panther Pumps & Equipment Co., Chicago, Ill., a corporation of Illinois
Filed Dec. 28, 1962, Ser. No. 247,960
4 Claims. (Cl. 285—149)

This invention relates to coupling fittings for bands, such as conduits and the like, and is more particularly directed to new and improved methods and means for coupling flexible hoses.

Heretofore, difficulty has been encountered in the design of coupling fittings for flexible bands, particularly coupling fittings for high pressure hoses and the like. One of the design problems previously encountered was that of sealing the end of the hose to the coupling fitting. It has been usual practice in the art to slip the fitting over the hose and compress the fitting thereabout both to secure the fitting directly to the hose and to seal the hose and fitting. Or in other cases, the fitting was secured and sealed to the hose by a crimped collar or gasket which would compress the hose. These prior art devices for securing and sealing the fitting and hose had the inherent disadvantage of reducing the diameter of the hose passageway and thereby increase the pressure at the hose and fitting sealing area.

With the present invention, the aforementioned problems and difficulties of the prior art are substantially overcome by the provision of a self-sealing pressure hose fitting assembly employing a hose having a flexible end, said hose being encased in a flexible material which is capable of bunching up or forming a raised annular collar during assembly of the hose and fitting and which is compressed between male and female fitting members of the coupling to secure the hose to the coupling, in which assembly the exposed end of the hose is press-fitted in one of said fitting members to seal the hose and fitting without a reduction in the diameter of the passageway of the hose, and in which assembly the sealing effect between the hose and fitting is increased with an increase in fluid pressure in the passageway of the hose.

It is, therefore, an object of the present invention to provide a new and improved hose fitting assembly.

Another object of the present invention is to provide a new and improved hose fitting assembly which is self-sealing.

Still another object of the present invention is to provide a self-sealing hose fitting assembly usable with a flexible hose.

A further object of the present invention is to provide a hose fitting assembly including a hose encased in a casing capable of bunching up to form a collar at one end of the hose, said collar being compressible between members of the fitting to secure the hose to the fitting without compressing the hose.

A still further object of the present invention is to provide a hose and fitting assembly in which the hose and fitting are self-sealing in such a manner that the sealing effect therebetween increases with an increase in the fluid pressure in the hose.

Another object of the present invention is to provide a flexible hose and fitting assembly wherein the hose is constructed of plastic material.

Still another object of the present invention is to provide a flexible hose and fitting assembly wherein the end of the hose secured to the fitting is not appreciably compressed to reduce the cross-sectional dimension of the hose passageway.

These and other objects, features and advantages of the present invention will become readily apparent to those versed in the art, from a careful consideration of the following detailed description, when considered in conjunction with the accompanying drawing illustrating a preferred embodiment of the present invention, wherein like reference numerals and characters refer to like and corresponding parts throughout the several views, and wherein:

FIG. 1 is an exploded view in partial vertical section of a hose and fitting assembly constructed in accordance with the principles of the present invention.

FIG. 2 is a view similar to FIG. 1 illustrating the initial steps of forming the casing end collar, and FIG. 3 is a view similar to FIG. 2 illustrating the completed assembly of the hose and fitting.

Although the present invention has a variety of applications, a preferred embodiment of a hose and fitting assembly constructed in accordance therewith appears in the drawing and comprises, in general, an encased flexible hose, generally indicated by the numeral 4, comprising a plastic tubing or conduit 6, constructed of material such as nylon, Teflon, polyethylene and the like, encased in a flexible metallic braid casing 8, and a female fitting member 10 slidably mounted on the hose, and internally threaded for engaging the external threads of a male fitting member 12. The end 11 of the tubing or conduit 6 may be any material which is flexible, and which may be press-fitted in an axial bore formed in the male fitting 12 for purposes hereinafter more fully described. The material of construction of the liner or conduit 6 should be such that the end 11 thereof may be press-fitted in the passage of the male fitting 12 without causing substantial reduction in the diameter of the passageway of the liner 6. Preferably, the material of construction of the liner is such that it may be so press-fitted that it causes no reduction in the diameter of the liner.

The outer casing 8 may be provided for insulating and like purposes and constructed preferably of a metal braid. The casing 8, shown in FIG. 1, is constructed of a metallic braid woven in such a manner that, when pressure is applied to the end 13 thereof, the material will laterally bunch up or wad and thereby provide a raised substantially annular gasket collar 16 (FIGS. 2 and 3) which is adapted to be compressed against a transverse end 15 of the male member 12 and an internal tapered annular shoulder 17 provided in an axial bore formed through the female member. Thus, with this arrangement, the requirement for and cost of a separate sealing gasket to secure the hose 4 to the fitting member 12 is eliminated by employment of applicant's invention. The annular portion 16 of the casing 8 is, as described hereinafter, assembly formed and the hose is secured to the fitting by the casing gasket 16 without the liner entering into the securing operation whereby the problem of reducing the diameter of the passageway of the hose liner is eliminated.

The female fitting member 10 is axially bored and is slidably carried by the hose 4 as appears in FIGS. 2 and 3. The bore of the female fitting member 10 is of a diameter greater than the outside diameter of the hose 4 to facilitate sliding movement of the fitting 10 on the hose 4. A portion 18b of the bore of the fitting 10 is of a diameter greater than the portion 18a of the bore to which it is joined by the tapered annular shoulder 17. The portion 18b is provided with internal threads 19 for mating with external threads 21 formed on the male fitting 12.

The male fitting 12 is provided with axial bore 26 having a portion 22 which is provided with an annular tapered portion 23 connecting the portion 22 to a reduced diameter portion 25 which is of uniform diameter. The bore 26 is also provided with an inwardly frusto-conically tapered portion 27 which is separated from the greater diameter portion 22 by the reduced diameter portion 25. The tapered portion 27 of the bore 26 is provided to facilitate insertion of the exposed portion of the end 11 of the liner 6 of the hose 4, into the bore 26 as appears in FIGS. 2 and 3.

The exposed end of the hose lined 6 is passed through the tapered portion 27 of the bore and into the constant diameter portion 25. The constant diameter portion 25 is of a diameter slightly less than the outer diameter of the exposed end of the liner 6 so that the end of the liner will become press-fitted or wedged in the bore portion 25. It is noted that the outer diameter of the liner 6 and the diameter of the bore portion 25 are such that the wedging of the end of the tubing in the portion 25 will not cause a reduction in the diameter of the passageway 7 of the liner 6.

It will be appreciated that with this construction of liner and male fitting member 12 the expansive forces of a high pressure fluid acting on the liner in flowing through the passageway 7 thereof adjacent the constant diameter portion 25 will increase the diameter of the plastic tubing line 6 and, thus, increase the sealing effect between the liner and fitting member in proportion to the pressure applied by the fluid to the liner. Thus, the sealing effect between the liner 6 and fitting increases in proportion to the fluid pressure acting on the liner 6.

Referring to FIG. 2, it will be observed that the cross-sectional diameter of the fluid flow passage in the liner 6 is not reduced by press fitting thereof in the constant diameter portion 25 of the male fitting member 12.

The locking gasket 16 may be assembly-formed in a manner now to be described.

It will also be observed that in press fitting the end of the tubing liner into the portion 25, the transverse end wall 15 of the nose 20 of the male fitting 12 acts against the end 13 of the casing to further increase the diameter of the raised annular locking gasket 16.

In FIG. 3, the female member 10 is shown slideably mounted on the hose 4 for threading to the nose 20 of the male member. In threading of the male and female members, the transverse end wall 15 of the nose 20 co-operates with the tapered shoulder 17 of the female fitting to complete formation of the self-locking gasket 16 and to secure the hose 4 to the fitting member. The taper of the shoulder 17 is provided to minimize the possibility of breaking of the gasket from the casing 8 in this area caused by bending of the flexible hose or by the application of external torsion forces to the hose.

It will thus be observed with the present invention that not only is there provided a flexible hose fitting assembly but also such an assembly having a self-sealing passaged hose liner and an assembly-formed gasket for securing the hose to the fitting members. The forces applied to lock or secure the hose to the fittings are applied to the casing and not to the hose liner 6, thus eliminating the problem of crimping of the hose liner and a reduction in the diameter of the passageway in the hose liner. In addition, the hose liner is self-sealing to the fitting member, the sealing effect increasing proportionally to an increase in the fluid pressure of the fluid passing through the passageway 7 of the liner. The press fitting feature of the hose in the male fitting provides means for assuring that the exposed end of the hose will not slip out of the male fitting when the hose liner is under zero or no fluid pressure conditions.

In one method of assembling the hose and fitting members, the female member 10 is slipped over the hose 4 and, with a fingernail or the like, the end 13 of the hose casing 8, as appears in FIG. 1, may be pushed to the left as viewed in FIG. 1, to expose the end 11 of the liner 6 and to initiate formation of an assembly-formed gasket 16. Enough of the end 11 of the liner 6 is exposed to permit insertion of a portion of the exposed end 11 into the constant diameter portion 25 of the male fitting as appears in FIG. 2. In press-fitting the end 11 of the hose liner 6 in the portion 25, the end wall 15 of the nose of the male member 12 engages the gasket 16 and acting thereagainst causes a further increase in the diameter of the raised gasket 16.

The female member 10 is now threaded to the nose 20 of the male member 12 to secure the hose to the fitting members. In so threading the members 10 and 12, the formation of the assembly-formed gasket 16 is completed. Completion of the formation of the gasket 16 is effected by the cooperative force-applying action of the end 15 of the male member 12 with the tapered shoulder 17 of the female member 10 to squeeze the gasket therebetween.

The hose and fitting assembly is now ready for use as a coupling or the like and for this purpose threads 40 may be provided on the male coupling member 12.

The present invention, therefore, exhibits features of ease of assembly, ease of assembly of flexible hoses to fittings, an assembly-formed locking gasket securing the hose to the fitting members, a hose and fitting assembly in which the diameter of the hose passageway is not reduced in securing the hose to the fitting, a hose and fitting assembly in which the sealing effect between the hose and fitting is increased with an increase in fluid pressure flowing through the passageway of the hose, a hose and fitting assembly in which the sealing effect is maintained when the hose is under zero or no fluid pressure, a hose and fitting assembly which is easily repaired in the event the assembly formed gasket is damaged or broken, a hose and fitting assembly which is easily repaired in the event the end of the hose is damaged, and a hose and fitting assembly which utilizes readily available and cheap materials in an efficient and economical manner.

Although various minor modifications of the present invention will become readily apparent to those versed in the art, it should be understood that what is intended to be encompassed within the scope of the patent warranted hereon are all such embodiments as reasonably and properly fall within the scope of the contribution to the art hereby made.

I claim:
1. A conduit assembly having an assembly-formed locking gasket comprising an inner conduit having an outer casing, said casing having an end which will bunch up and increase in outside diameter relative to the outside diameter of the remainder of the casing to thereby form a locking gasket collar and to expose a portion of one end of said conduit when an external axial force is applied to said end of the casing, a first fitting member having a bore therethrough of an internal diameter substantially equal to the internal diameter of the conduit and casing and through which said conduit and casing extend, said first member having an internally threaded counterbore at one end and a radially extending abutment shoulder adjacent the inner end of said counterbore, a second fitting member having external threads located inwardly of one end of said second fitting member for threaded engagement with the threads of the first fitting member, said second fitting member also having a bore therethrough of a diameter at said one end substantially equal to the external diameter of said conduit for receiving said exposed end of the conduit, said one end of said second fitting member engaging with said one end of the casing to initiate formation of said locking collar during threading of said fitting members, the axially extending walls of said counterbore of said first fitting member and the outer surface of said one end of said second fitting member defining a space therebetween for receiving a portion of said locking collar which is clamped between said abutment shoulder of said first fitting member and said one end of said second fitting member during threading of said fitting members to the complete conduit assembly.

2. The assembly of claim 1 wherein said bore of said second fitting is of a diameter to permit press fitting of said exposed end of said conduit therein.

3. The assembly of claim 1 wherein said one end of the casing is flexible.

4. A conduit assembly, according to claim 1, wherein said inner conduit is constructed of plastic material.

References Cited by the Examiner

UNITED STATES PATENTS

| | | | |
|---|---|---|---|
| 1,044,335 | 11/1912 | Ball | 285—149 |
| 1,054,244 | 2/1913 | Rudolph | 285—149 |
| 2,366,444 | 1/1945 | Dorman | 285—247 |
| 2,394,632 | 2/1946 | Parker | 285—149 |
| 2,534,198 | 12/1950 | Guarnaschelli | 285—334.5 |
| 2,564,244 | 8/1951 | Fraser | 285—149 |
| 3,120,966 | 2/1964 | Lyon | 285—149 |

CARL W. TOMLIN, *Primary Examiner.*

S. R. MILLER, *Assistant Examiner.*